Figure 1:
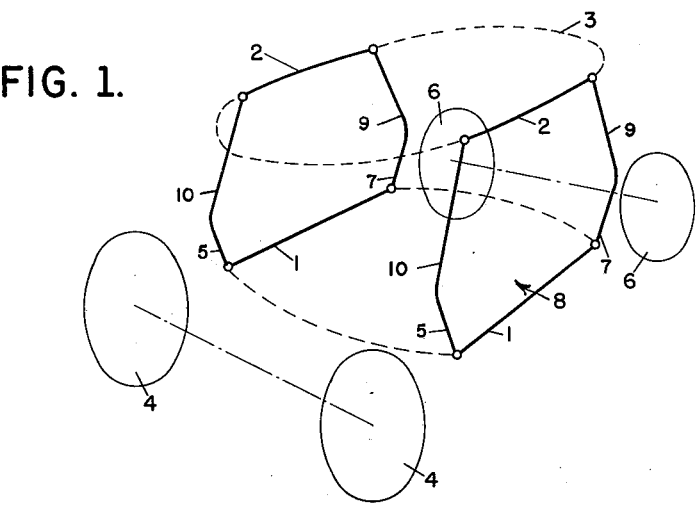

March 5, 1963  B. BARÉNYI  3,080,190

FRAME CONSTRUCTION FOR MOTOR VEHICLES

Filed Sept. 12, 1960

INVENTOR
BÉLA BARÉNYI

BY Dicke, Craig & Freudenberg
ATTORNEYS

United States Patent Office 3,080,190
Patented Mar. 5, 1963

3,080,190
FRAME CONSTRUCTION FOR MOTOR VEHICLES
Béla Barényi, Stuttgart-Vaihingen, Germany, assignor to Daimler-Benz Aktiengesellschaft, Stuttgart-Unterturkheim, Germany
Filed Sept. 12, 1960, Ser. No. 55,314
6 Claims. (Cl. 296—28)

The present invention relates to a frame construction, especially intended for passenger motor vehicles, which is provided with two longitudinal bearer sill members extending in the vehicle longitudinal direction approximately within the plane of the tires which are provided, directly behind the front wheel and in front of the rear wheel, with upwardly-extending portions passing over into the support columns for the roof and which are so connected with each other by the roof or the lateral box-type bearer members supporting the roof that on each side of the vehicle an annularly-shaped closed frame is produced thereby.

The present invention is based on the newest recognitions in the field of vehicle construction which indicate that in case of accidents, and especially in case of heavy impact accidents, the vehicle passengers can be safeguarded from serious bodily injuries only if the center part of the vehicle superstructure enclosing the passenger space, is constructed extraordinarily rigid, whereas the portions of the vehicle adjoining the same in the forward and rearward directions have to be constructed relatively weaker and relatively yielding.

With such a construction of a motor vehicle, the kinetic energy during impact collisions is transformed into work for deforming the vehicle end parts, whereas the rigid center cell or passenger compartment will remain essentially undamaged and thereby safely protects the passengers.

It has also been demonstrated that a vehicle construction in accordance with these recognitions must not have a rigid frame extending approximately at the height of the wheel axes but that the longitudinal bearer members thereof have to be bent or offset upwardly over the wheels and have to be extended forwardly and rearwardly above the wheels with relatively smaller cross sections. Consequently, the forces occurring during impact collisions such as front or rear end collisions are transmitted, not approximately at the height of the wheel axes at which the bumpers are normally arranged, but instead at the height of the upper edge of the tires, i.e., approximately at half the height of the vehicle, to the center part of the vehicle superstructure.

Accordingly, the present invention is predicated on the task to impart to the center part of the vehicle superstructure an increased torsion and form rigidity, and to construct the same especially for purposes of absorbing impact forces introduced into the vehicle at approximately half the height thereof.

The supporting frames known heretofore in the prior art, which are provided on each side of the vehicle with annular closed frames, are not suitable for purposes of solving the aforementioned task underlying the present invention because the columns connecting the lower longitudinal bearer members with the roof are not constructed, as regards strength as well as configuration thereof, for purposes of absorbing relatively large maximum or peak forces.

For example, frameworks for motor vehicles are known in the prior art in which the forward and rearward columns of the frame are slightly inclined inwardly or, at best, are disposed vertically on the longitudinal bearer member, and are connected with each other within the region of the roof in a bow-shaped manner so that these columns, during impacts, are likely to be bent in or buckled.

In another known type of vehicle construction, the forward and rearward columns are inclined inwardly with respect to the horizontal so that this frame forms approximately a parallelogram. With this type of frame, the columns are also likely to be readily bent in or buckled with impacts or may be readily broken off at the base thereof in case of high, frontally-directed impacts.

These disadvantages of the known motor vehicle frameworks are avoided by the present invention. Additionally, the present invention is concerned with the problem to equip passenger motor vehicles provided with sliding doors, with a precise, form-rigid and stable bed or framework for the doors, especially for a sliding door. The outer frame or jamb for the door is to constitute, in accordance with the present invention, a construction which is rigid and sturdy in itself. Such a feature is also of extraordinary significance for purposes of accident protection, because the passengers of a motor vehicle are oftentimes thrown out of the vehicle as a result of inadvertent or unintentional opening of the doors during accidents and are thereby seriously injured.

Furthermore, the present invention aims at an improved anchoring of the large-surfaced, arcuate window panes, especially of the so-called panorama windows which are used in modern passenger motor vehicle constructions to an ever-increasing extent.

Departing from a framework for motor vehicles of the type described hereinabove, the present invention essentially consists in providing a frame having the shape of a hexagon with horizontal lower and upper sides and with forwardly inclined and rearwardly inclined sides extending from the forward and rearward ends of the horizontal sides, respectively, of which the horizontal sides are formed by the longitudinal sill bearer members and by the roof bearer members while the forward and rear sides thereof are formed by the upwardly-extending parts and support columns which intersect or meet at an angle approximately within the region of half the vehicle or at the height of the upper tire edge.

According to a further feature of the present invention, the frame structural parts forming the hexagon which adjoin one another may subtend angles with each other which are larger than 90°. Furthermore, the corners of the hexagon may also be rounded-off appropriately.

For purposes of simplification of manufacture, and for purposes of further increasing the stability, it is advantageous in accordance with the present invention if the lateral structural frame parts combined into a hexagon are constructed symmetrically with respect to the transverse center plane of the vehicle. For similar reasons, the laterally closed hexagon disposed in the vehicle longitudinal direction may simultaneously form a part of the roof frame which is preferably of annular shape, especially of oval shape. Additionally, the transverse bearer members may be arranged for purposes of connecting the lateral hexagonal frames with each other within the regions of the roots of the columns supporting the roof, whereby the rigidity of the framework center part is additionally increased.

Accordingly, it is an object of the present invention to provide a frame construction for motor vehicles which increases the safety for the passengers within the vehicle especially in case of front or rear-end collisions.

It is another object of the present invention to provide a framework construction for the passenger space of a motor vehicle which is exceedingly resistant to impact forces, and which is so constructed as to offer a particular rigidity and stability against longitudinally-extending forces applied thereagainst at approximately half the height of the vehicle or the height of the upper tire edge.

Still another object of the present invention resides in the provision of a motor vehicle frame construction in which the part of the framework defining the passenger space is of great rigidity, whereas the parts of the framework extending therefrom in the vehicle longitudinal forward and rearward direction are so constructed as to provide a certain yieldingness to thereby transform impact forces into work energy for deforming the front and rear frame parts while, at the same time, assuring that the longitudinally-extending forces are introduced into the center framework of the present invention, not at the height of approximately the wheel axles, but either approximately at the upper tire edge or half the height of the vehicle.

Another object of the present invention resides in the construction of a center frame part for motor vehicles which imparts increased torsional and form rigidity to the passenger space.

A still further object of the present invention is the provision of a center framework for the passenger space of a motor vehicle wherein the supporting columns supporting the floor frame parts with the roof frame part are so arranged and constructed as to preclude that the same are bent or broken off in case of longitudinally-directed forces applied thereagainst during collisions.

Still another object of the present invention resides in the provision of a framework for the passenger space of a passenger motor vehicle which, at the same time, forms a rigid framework for the door of the vehicle, especially for sliding doors.

A further object of the present invention lies in the provision of a framework of the type mentioned hereinabove for the passenger space of vehicles which, at the same time, forms the support for large-surfaced, arched window panes, such as panoramic windows used widely in modern vehicle design.

Figure 2:
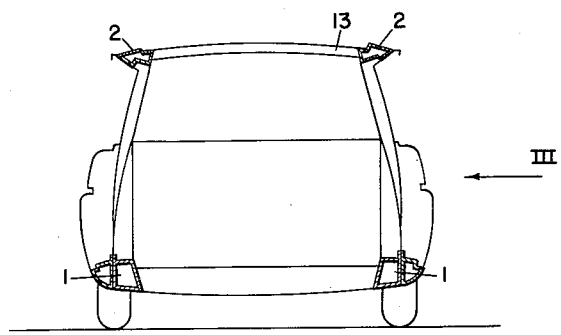
Figure 3:
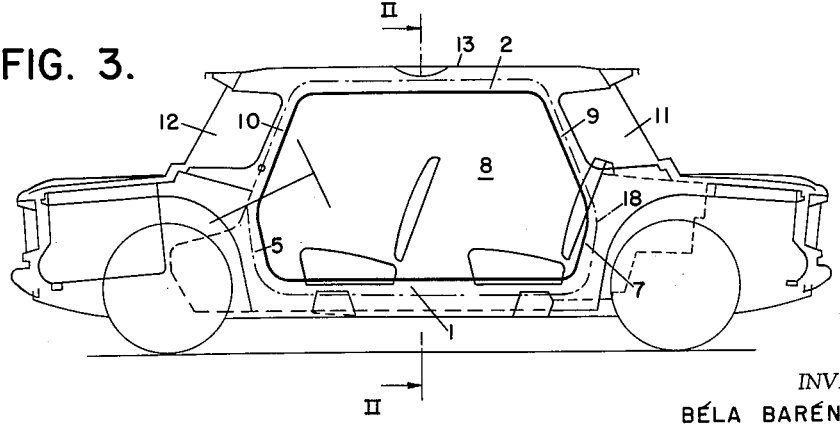

These and other objects, features and advantages of the present invention will become more apparent from the following description, when taken in connection with the accompanying drawing which shows, for purposes of illustration only, one embodiment in accordance with the present invention, and wherein FIGURE 1 is a schematic view of the lateral closed hexagon of the framework for the passenger space of a motor vehicle in accordance with the present invention, FIGURE 2 is a center transverse cross-sectional view through a passenger motor vehicle in accordance with the present invention, taken along line II—II of FIGURE 3, and FIGURE 3 is a side view of the passenger motor vehicle of FIGURE 2 taken in the direction of arrow III.

Referring now to the drawing, wherein like reference numerals are used throughout the various views to designate corresponding parts, and more particularly to FIGURE 1, this figure shows the significant parts of the framework of a passenger motor vehicle for use with the present invention. It may be readily ascertained from FIGURE 1 that the longitudinal bearer members 1 or parts thereof, the parts 2 of the roof frame 3, the parts 5 and 10 extending upwardly behind the front wheels 4, and the parts 7 and 9 extending upwardly in front of the rear wheels 6 form together the lateral hexagonal framework in accordance with the present invention, which is generally designated in FIGURE 1 by reference numeral 8.

FIGURES 2 and 3 show the application of the basic inventive concept, indicated in FIGURE 1, to an actual construction of a motor vehicle.

In FIGURE 2, the parts 2 of the roof frame or of the roof annular bearing member belonging to the hexagon 8 are illustrated as box-shaped profile members. In a similar manner, the longitudinal bearer members 1 are constructed as box-shaped profile members or hollow bearer members.

FIGURE 3 illustrates the side view of the passenger motor vehicle of FIGURE 2 in the direction of arrow III of FIGURE 2. The embodiment of FIGURES 1–3 thereby relates to a vehicle provided with a sliding door though the present invention is not necessarily limited to such sliding door, even though it is of particular advantage in connection therewith. The sliding door, however, has been omitted in FIGURES 2 and 3 for clarity's sake so that in FIGURE 3 only the door aperture is visible into which the door is placed during closing thereof. The door aperture represents essentially the shape of the hexagon 8 in accordance with the present invention. The dot and dash line 18 of FIGURE 3 thereby represents the approximate position of the neutral fiber of the frame parts 1, 2, 5, 7, 9 and 10 combined into the hexagon 8. As may be readily seen from FIGURE 3, the parts 5 and 10 and the parts 7 and 9 intersect or meet at an angle approximately at the height of the upper tire edge which corresponds to approximately half the height of the vehicle. As a result thereof, the framework according to the present invention is particularly suited for the absorption of forces and impacts introduced into the framework at this height. This may be readily achieved by the fact that the frame parts in the front and rear end of the vehicle are connected with the hexagonal frame parts of the passenger space at approximately that height, whereby the frame parts in the front and rear ends, as mentioned hereinabove, are so constructed and arranged as to extend over the wheels.

The lateral upwardly extending parts, especially the support columns 9 and 10 for the roof 13, simultaneously serve for purposes of supporting therein the rear window pane 11 and the front window pane 12, respectively. These panes 11 and 12 are of large surface and of curved configuration. As a result of the closed hexagonal configuration and construction of the lateral framework for the passenger motor vehicle, these window panes 11 and 12 also receive a stable, torsion-rigid support base for the securing thereof in the vehicle.

A sliding door requires a stable bearing support therefor by reason of the large-surfaced construction i.e., a framework in closed condition in order that rattles and vibrations of the door and annoying noises resulting therefrom can be effectively eliminated and avoided. Furthermore, a solid embedment of the sliding door has to be present by reason of the fact that otherwise deformations of the door or of the parts surrounding the door would take place. By the use of the surrounding framework for the door in accordance with the present invention constituted by the frame parts 1, 2, 5, 7, 9 and 10, such a stable and sturdy support as is necessary is created thereby. The described increased stability is achieved essentially by the use of the part 2 of the roof frame 3 or of the roof 13 for purposes of forming the hexagon 8. As may be readily ascertained from FIGURE 3, the corners of the hexagon 8 are rounded off and the mutually-adjoining frame parts, for example, parts 1—5, 5—10, 10—2, etc. form with each other angles which may be greater than 90°.

It may also be readily seen from FIGURE 3 that the hexagon 8 is constructed completely symmetrically with respect to the center transverse plane of the vehicle. A far-reaching simplification of manufacture is achieved thereby.

As illustrated in FIGURES 1 and 2, the hexagon 8 does not necessarily have to be disposed in a single plane, but instead it may be adapted in the upper region thereof to the oval or elliptical form 3 of the roof, as shown by the parts 2 in FIGURE 1 and may, therefore, be curved or arched in several directions. For purposes of connecting the two lateral hexagonal frames with each other, additional cross-bearer members in addition to the cross bearer members within the region of the longitudinal bearers 1 and, for example, of the oval roof frame 3, may be arranged within the region of the roots of the columns 9 and 10 supporting thereon the roof which then serve for the further reinforcement and rigidification of the framework according to the present invention.

It is also understood that within the purview of the present inventive concept, other possibilities for the construction of the hexagon 3 are feasible in adaptation to the particular, desired vehicle type.

While I have shown and described only one embodiment in accordance with the present invention, it is understood that the same is not limited thereto but is susceptible of many changes and modifications within the spirit and scope of the present invention, for example, in adaptation to the particular, desired type of vehicle, and I, therefore, do not wish to be limited to the details shown and described herein but intend to cover all such changes and modifications as are encompassed by the scope of the appended claims.

I claim:

1. A framework, especially for passenger motor vehicles having front and rear wheels with tires thereon, comprising essentially longitudinal bearer means extending in the vehicle longitudinal direction and including first bearer portions disposed approximately in the plane of the tires, and extending over respective vehicle wheels, said longitudinal bearer means also including upwardly extending bearer portions directly behind the front wheels and directly in front of the rear wheels which pass over into supporting columns adapted to support thereon the roof of the vehicle, and roof supporting means connecting said upwardly extending bearer portions in such a manner that an approximately annularly-shaped, closed frame is produced thereby on each vehicle side, each of said closed frames being of essentially hexagonal shape and each including essentially approximately horizontal upper and lower sides and four sides extending obliquely forwardly and rearwardly from the forward and rearward ends of the horizontal sides thereof, said horizontal sides being formed by parts of said longitudinal bearer means and by said roof supporting means while the front and rear sides thereof are formed by said upwardly extending bearer portions and said supporting columns which intersect at an angle at approximately the height of the upper tire edge, said bearer portions of said longitudinal bearer means extending over respective vehicle wheels being constructed weaker than said hexagonal frames so that any impact forces introduced into the vehicle in the longitudinal direction thereof are transformed into deformation work upon said first bearer portions while leaving essentially undamaged the passenger space enclosed by said hexagonal frames.

2. A framework, especially for passenger motor vehicles having front and rear wheels with tires thereon, comprising essentially longitudinal bearer means extending in the vehicle longitudinal direction and including first bearer portions disposed approximately in the plane of the tires and extending over respective vehicle wheels, said longitudinal bearer means also including upwardly extending bearer portions directly behind the front wheels and directly in front of the rear wheels which pass over into supporting columns adapted to support thereon the roof of the vehicle, and roof supporting means connecting said upwardly extending bearer portions in such a manner that an approximately annularly-shaped, closed frame is produced thereby on each vehicle side, each of said closed frames being of essentially hexagonal shape and each including essentially approximately horizontal upper and lower sides and four sides extending obliquely forwardly and rearwardly from the forward and rearward ends of the horizontal sides thereof, said horizontal sides being formed by parts of said longitudinal bearer means and by said roof supporting means while the front and rear sides thereof are formed by said upwardly extending bearer portions and said supporting columns which intersect at an angle at approximately the height of the upper tire edge, said bearer portions of said longitudinal bearer means extending over respective vehicle wheels being of a smaller cross section than said hexagonal frames so that any impact forces introduced into the vehicle in the longitudinal direction thereof are transformed into deformation work upon said first bearer portions while leaving essentially undamaged the passenger space enclosed by said hexagonal frames.

3. A framework according to claim 2, wherein said roof supporting means includes lateral box type bearer members interconnecting said supporting columns.

4. A framework according to claim 2, wherein the upwardly extending bearer portions and supporting columns intersect with each other at an angle greater than 90°.

5. A framework according to claim 2, further comprising cross bearer means for connecting the lateral hexagonal frames with each other within the region of the roots of said supporting columns.

6. A framework according to claim 2, further comprising transverse bearer means forming together with said supporting columns a supporting frame for panoramic windows.

References Cited in the file of this patent

UNITED STATES PATENTS

| | | |
|---|---|---|
| 1,953,515 | Smith | Apr. 3, 1934 |
| 2,626,180 | Thompson | Jan. 20, 1953 |
| 2,864,646 | Wilfert | Dec. 16, 1958 |
| 2,988,397 | Brueder | June 13, 1961 |

FOREIGN PATENTS

| | | |
|---|---|---|
| 1,049,109 | France | Aug. 12, 1953 |
| 963,220 | Germany | May 16, 1957 |
| 736,060 | Great Britain | Aug. 31, 1955 |